United States Patent
Picot et al.

(10) Patent No.: US 7,602,793 B2
(45) Date of Patent: Oct. 13, 2009

(54) METHOD OF BLOCKING ALERT MESSAGES TO MOBILE UNITS

(75) Inventors: Carol M. Picot, Boonton Township, NJ (US); David A. Rossetti, Randolph, NJ (US); Lily H. Zhu, Parsippany, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 551 days.

(21) Appl. No.: 11/304,066

(22) Filed: Dec. 15, 2005

(65) Prior Publication Data

US 2007/0140186 A1 Jun. 21, 2007

(51) Int. Cl.
*H04L 12/28* (2006.01)
*H04W 36/00* (2009.01)

(52) U.S. Cl. .................. 370/400; 455/440
(58) Field of Classification Search ........... None
See application file for complete search history.

(56) References Cited

U.S. PATENT DOCUMENTS

| | | | |
|---|---|---|---|
| 4,829,554 A * | 5/1989 | Barnes et al. ............ 455/432.1 |
| 5,705,980 A * | 1/1998 | Shapiro ................. 340/539.11 |
| 6,064,892 A * | 5/2000 | Miyagawa et al. .......... 455/560 |
| 6,832,093 B1 * | 12/2004 | Ranta .................... 455/456.4 |
| 2001/0041577 A1 * | 11/2001 | Weber et al. .............. 455/458 |
| 2001/0055394 A1 * | 12/2001 | Vanttinen et al. ........... 380/258 |
| 2002/0198025 A1 * | 12/2002 | Brownlee et al. .......... 455/561 |
| 2006/0003775 A1 * | 1/2006 | Bull et al. ............... 455/456.1 |
| 2006/0073834 A1 * | 4/2006 | Thorson .................. 455/450 |
| 2006/0276207 A1 * | 12/2006 | Harris et al. ............. 455/466 |

* cited by examiner

Primary Examiner—Pankaj Kumar
Assistant Examiner—Eunsook Choi

(57) ABSTRACT

The present invention provides a method is provided for blocking alert messages to mobile units. The method includes determining at least one location of at least one mobile unit based on at least one response to a first page message provided to the at least one mobile unit. The method also includes interrupting transmissions to the at least one mobile unit based on said at least one determined location of said at least one mobile unit.

12 Claims, 4 Drawing Sheets

METHOD OF BLOCKING ALERT MESSAGES TO MOBILE UNITS

BACKGROUND OF THE INVENTION

1. Field of the Invention

This invention relates generally to communication systems, and, more particularly, to wireless communication systems.

2. Description of the Related Art

The coverage area of a wireless communication system is typically divided into a number of cells, which may be grouped into one or more networks. Mobile units located in each cell may access the wireless communications system by establishing a wireless communication link, often referred to as an air interface, with a base station associated with the cell. The mobile units may include devices such as mobile telephones, personal data assistants, smart phones, Global Positioning System devices, wireless network interface cards, desktop or laptop computers, and the like. Mobile units may initiate communication with a base station by providing a signal on an access channel. The base station may then use the received access channel signal to establish the wireless communication link between the mobile unit and the base station on a separate traffic channel. The mobile unit and the base station may then exchange messages over the air interface using the traffic channel.

The base station may also initiate communication with the mobile unit. For example, the base station may receive a signal indicating that another user has placed a call destined for the mobile unit. The base station may then attempt to locate the mobile unit by broadcasting a paging message over an area associated with the last known position of the mobile unit. If the base station receives a paging response from the mobile unit, indicating that the mobile unit is in the area near the last known position, the base station may initiate a series actions and/or procedures to establish a wireless communication link with the mobile unit. However, if the base station does not receive a paging response from the mobile unit, the Radio Access Network (RAN) may escalate the level of paging (e.g., broaden the paging area) by providing a paging signal to one or more areas proximate the area near the last known position. If the mobile unit continues to be unresponsive to the paging signal, paging signals may be broadcast to additional areas until the mobile unit is located or the number of allowed pages has been exhausted. This strategy for locating mobile units is conventionally referred to as "paging escalation."

FIG. 1 conceptually illustrates a conventional procedure 100 for paging a mobile unit (MU) and establishing a wireless communication channel. In the illustrated embodiment, a mobile switching center (MSC) initiates the call flow by providing a page request to a base station (BS), as indicated by the arrow 105. The base station provides a paging message in response to receiving the page request, as indicated by the arrow 110. If the mobile unit receives the page message, the mobile unit provides a page response message to the base station, as indicated by the arrow 115. The base station acknowledges the page response message, as indicated by the arrow 120, and provides a base station page response to the mobile switching center, as indicated by the arrow 125. The base station may provide a base station traffic channel initialization message to the mobile unit, as indicated by the arrow 130. The base station may also receive a page response message from the mobile switching center, as indicated by the arrow 135.

In the illustrated embodiment, the base station then provides a traffic channel assignment message to the mobile unit, as indicated by the arrow 140, and the mobile unit may respond with a mobile unit traffic channel initialization message, as indicated by the arrow 145. The base station may then acknowledge the mobile unit traffic channel initialization message, as indicated by the arrow 150. A backhaul link between the base station and the mobile switching center may then be set up, as indicated by the double-headed arrow 155, and a service configuration may be negotiated between the mobile unit and the base station, as indicated by the double-headed arrow 160. The base station may transmit a traffic channel confirmation message to the mobile switching center as indicated by the arrow 165. The base station may also transmit an alert message to the mobile unit, as indicated by the arrow 170. The mobile unit may use the alert message to provide an alert signal, such as a ring, a vibration, a flashing light, and the like to the end user. The mobile unit may then connect to the base station, as indicated by the arrow 175, and then the base station may provide an answer message to the mobile switching center, as indicated by the arrow 180.

Recent events have drawn attention to the possibility that the conventional techniques for paging a mobile unit may be put to malicious use. For example, alerting circuitry in a mobile unit, such as the circuitry that provides ring tones, vibration, flashing lights, and the like, may be wired to an explosive device. The mobile phone and the explosive device may be placed in a vulnerable location such as a tunnel or a bridge and the explosive device may be detonated remotely by placing a call to the mobile unit. For example, the wireless network may locate the mobile unit by transmitting a page message and may transmit an alert message in response to receiving a page response message from the mobile unit. When the mobile unit receives the alert message, an electrical signal may be provided to the alerting circuitry, which may transmit the signal to the explosive device, triggering detonation.

One proposal for preventing or reducing the possibility of an explosive device being triggered by a conventional mobile unit is to define designated security areas near vulnerable locations. Page messages to mobile units in these designated security areas may then be blocked so that a call placed to the mobile units in the designated security areas cannot be used to detonate an explosive device. However, blocking page messages to a large area can dramatically reduce the efficiency of the wireless network, at least in part because of paging escalation. In particular, if page messages to all mobile units in the designated security area are blocked, then the designated security area will appear as a coverage hole to the wireless communication network, and mobile units in the designated security area will not be visible to the wireless communication network. Accordingly, calls to the mobile units in the designated security area will result in paging escalation to a broader area as the wireless communication network searches for the mobile units that are in the designated security area.

If the designated security area is relatively small, e.g., limited to one or two cells, the network impact caused by the paging escalation may be relatively small. However, the network impact of paging escalation may be significant if the designated security area is relatively large and the designated security area covers many cells. For example, escalation of the paging area may cause a paging channel load increase on base stations neighboring the designated security area, as well as an increase in the network traffic load, an increase in the processor occupancy load, and the like. These increased loads may cause degradation of the overall system performance, which may increase the likelihood of blocking and/or call dropping.

SUMMARY OF THE INVENTION

The present invention is directed to addressing the effects of one or more of the problems set forth above. The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for blocking alert messages to mobile units. The method includes determining at least one location of at least one mobile unit based on at least one response to a first page message provided to the at least one mobile unit. The method also includes interrupting transmissions to the at least one mobile unit based on said at least one determined location of said at least one mobile unit.

BRIEF DESCRIPTION OF THE DRAWINGS

The invention may be understood by reference to the following description taken in conjunction with the accompanying drawings, in which like reference numerals identify like elements, and in which.

Figure 1:
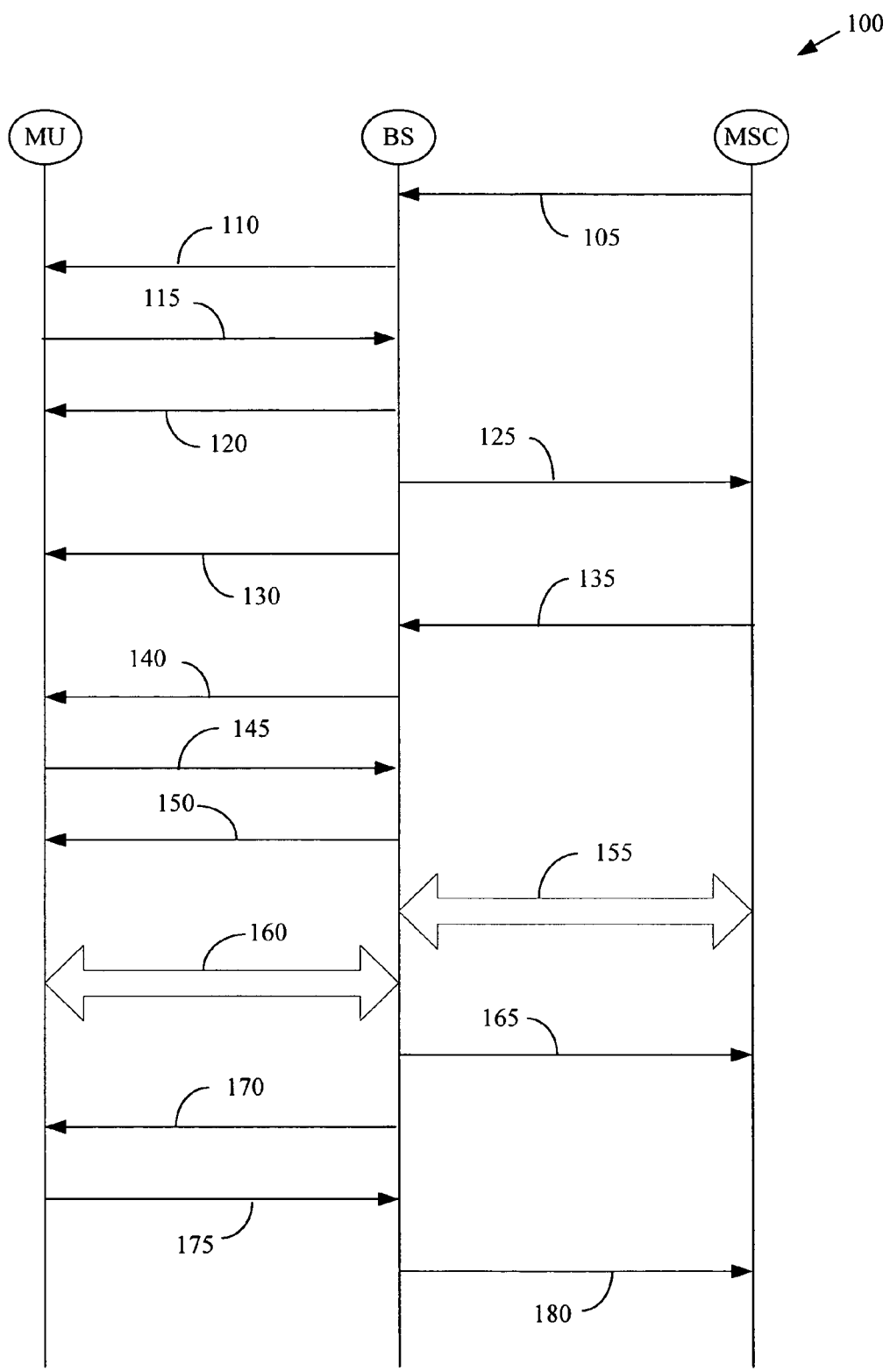
FIG. 1 conceptually illustrates a conventional call flow for paging a mobile unit (MU) and establishing a wireless communication channel.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2:
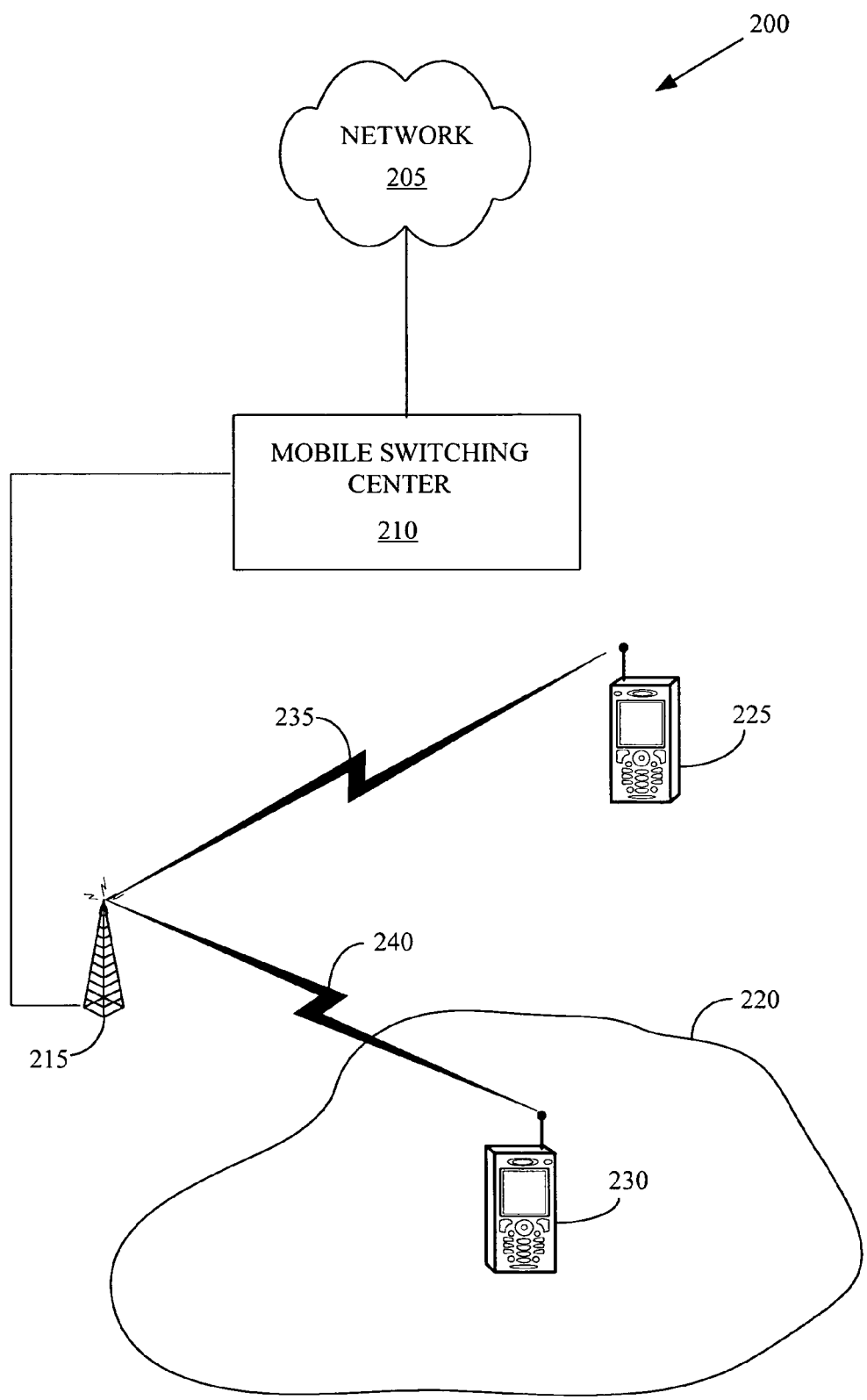
FIG. 2 conceptually illustrates one exemplary embodiment of a communication system, in accordance with the present invention.

FIG. 2 conceptually illustrates one exemplary embodiment of a communication system 200. In the illustrated embodiment, the communication system 200 includes a network 205, which may include any combination of wired and/or wireless networks operating according to any combination of wired and/or wireless protocols. For example, the network 205 may include a portion that operates according to an Internet protocol and a portion that operates according to a Universal Mobile Telecommunication Services (UMTS) protocol. However, persons of ordinary skill in the art should appreciate that the present invention is not limited to these exemplary protocols. In alternative embodiments, the network 105 may include portions that operate according to a Public Switched Telephone Network (PSTN) protocol, a Plain Old Telephone System (POTS) protocol, a Code Division Multiple Access (CDMA, CDMA2000) protocol, a Bluetooth protocol, one of the IEEE 802 protocols, and the like. In one embodiment, the network 205 may also include an optical portion including one or more fiber-optic cables and other supporting equipment.

In the illustrated embodiment, the network 205 is communicatively coupled to a mobile switching center 210, which is completely coupled to a base station 215. However, persons of ordinary skill in the art having benefit of the present disclosure should appreciate that alternative embodiments may include additional mobile switching centers 210 and/or base stations 215. Moreover, the network 205 may include other elements not shown in FIG. 1 that may be used in addition to the mobile switching center 210 and/or the base station 215 or instead of the mobile switching center 210 and/or the base station 215. For example, the network 205 may be communicatively coupled to one or more routers, switches, radio network controllers, Mobile-IP Home Agents, base station routers, and the like.

The mobile switching center 210 and the base station 215 are used to provide wireless connectivity to a geographical area, such as a cell or a portion of a cell. In one embodiment, the base station 215 provides wireless connectivity to a single cell. However, the base station 215 may provide wireless connectivity to a geographic area that includes portions of more than one cell or, alternatively, to a geographic area that is a portion of a single cell. For example, the base station 215 may include one or more beam-forming antennas that provide wireless connectivity to selected portions of a cell. Techniques for operating the mobile switching center 210 and the base station 215 are known to persons of ordinary skill in the art and in the interest of clarity only those aspects of the operation of the mobile switching center 210 and/or the base station 215 that are relevant to the present invention will be discussed further herein.

The base station 215 may provide wireless connectivity to a geographic area that includes one or more designated security areas 220. In various alternative embodiments, the designated security areas 220 may be defined in any manner. For example, the designated security areas 220 may be defined to include bridges, buildings, military bases, and/or other locations that may be considered potential targets. Persons of ordinary skill in the art having benefit of the present disclosure should appreciate that the designated security areas 220 may be modified at any time. For example, the geographical area encompassed by the designated security area 220 may only be considered a designated security area during periods of relatively high alert, such as during a time when the government has determined that a particular location may be at particularly high risk of attack.

Figure 3A:
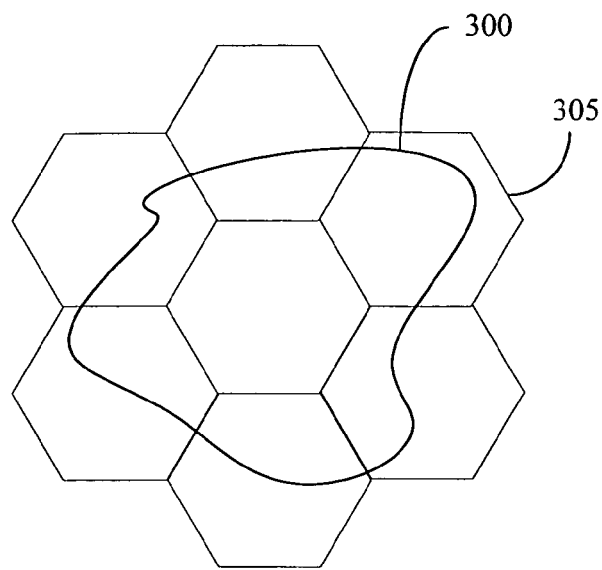
FIGS. 3A and 3B conceptually illustrate first and second exemplary embodiments, respectively, of a designated security area, in accordance with the present invention.
Figure 3B:
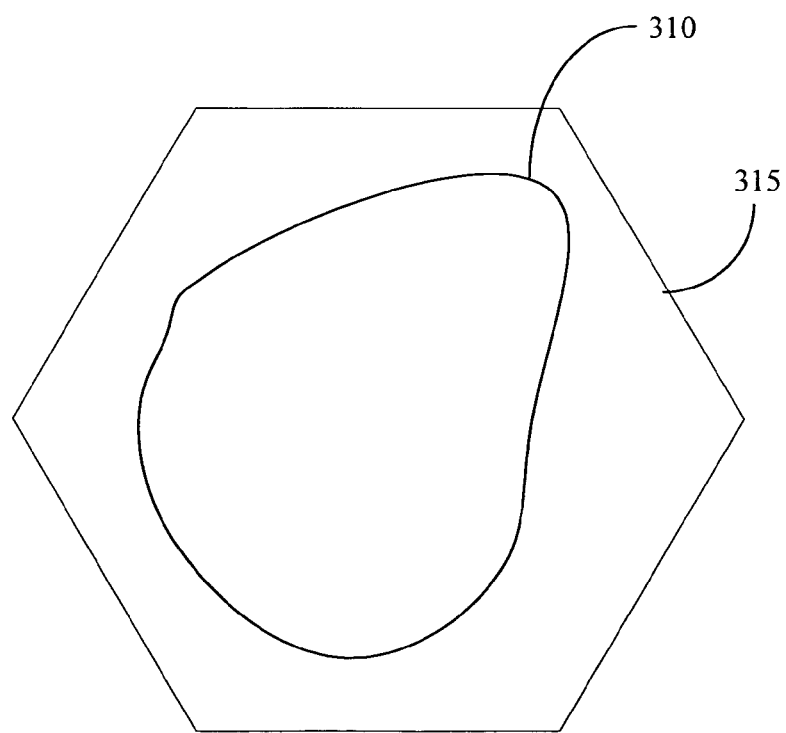

In various embodiments, the designated security areas 220 may encompass one or more cells or may be included within a single cell. FIG. 3A conceptually illustrates a first exemplary embodiment of a designated security area 300 that includes at least a portion of each of a plurality of cells 305. In the illustrated embodiment, some of the cells 305 are completely included in the designated security area 300 and portions of other cells 305 are included in the designated security area 300. FIG. 3B conceptually illustrates a second exemplary embodiment of a designated security area 310 that is completely encompassed by a cell 315. Although the boundaries of the designated security areas 300, 310 depicted in FIGS. 3A and 3B do not correspond to the boundaries of the cells 305, 315, the present invention is not so limited. In alternative embodiments, the designated security areas 220 may be defined so that their boundaries are approximately coincident with the boundaries of one or more cells.

Referring back to FIG. 2, one or more mobile units 225, 230 may be located within the wireless communication system 200. In one embodiment, the base station 215 may initiate communication with one or more of the mobile units 225, 230 by providing a page message over an associated air interface 235, 240. Persons of ordinary skill in the art should appreciate that, in some wireless communication protocols, the term "page message" may refer to a specific message having a specific format. For example, the CDMA protocol defines a Page Message that may be broadcast by the base station 215. However, the term "page message" will be used herein to refer to any message that may be broadcast to a geographic area that may include one or more mobile units 225, 230 to indicate that the base station 215 is attempting to initiate communication with the corresponding mobile unit 225, 230. Thus, the term "page message" may include specific messages defined by particular protocols, but is not limited to these specific messages.

One or more of the mobile units 225, 230 may receive a page message from the base station 215 and may provide a page response message over the associated air interface 235, 240 in response to the page message. Persons of ordinary skill in the art should appreciate that, in some wireless communication protocols, the term "page response message" may refer to a specific message having a specific format. For example, the CDMA protocol defines a Page Response Message that may be sent by the mobile units 225, 230. However, the term "page response message" will be used herein to refer to any message that may be transmitted by one or more mobile units 225, 230 to indicate that the corresponding mobile unit 225, 230 received a page message. Thus, the term "page response message" may include specific messages defined by particular protocols, but is not limited to these specific messages.

The base station 215 and/or the mobile switching center 210 may determine one or more locations associated with the mobile units 225, 230 based on the page response message. Techniques for determining locations of mobile units based on page response messages are known to persons of ordinary skill in the art. For example, if the boundaries of the designated security areas 220 correspond to the boundaries of one or more cells, the location of one or more of the mobile units 225, 230 may be determined by determining whether a page response message was received in response to a page message provided to one or more cells. For another example, the location of one or more of the mobile units 225, 230 may be determined by measuring the round-trip delay between the one or more mobile units 225, 230 and the base station 215 using timing information included in the page response message. Accordingly, in the interest of clarity only those aspects of determining the location of one or more of the mobile units 225, 230 that are relevant to the present invention will be discussed further herein.

In one embodiment, the page response message may be used to determine that the mobile unit 225 is not within the designated security area 220. The mobile switching center 210 and/or the base station 215 may therefore establish one or more traffic channels over the air interface 235. For example, the base station 215 may provide a traffic channel assignment message and/or an alert message over the air interface 235. Alternatively, the page response message may be used to determine that the mobile unit 230 is within the designated security area 220. The mobile switching center 210 and/or the base station 215 may therefore interrupt the call flow associated with the mobile units 230. In particular, the base station 215 may prevent transmission of a traffic channel assignment message and/or an alert message to the mobile unit 230 over the air interface 240.

Figure 4:
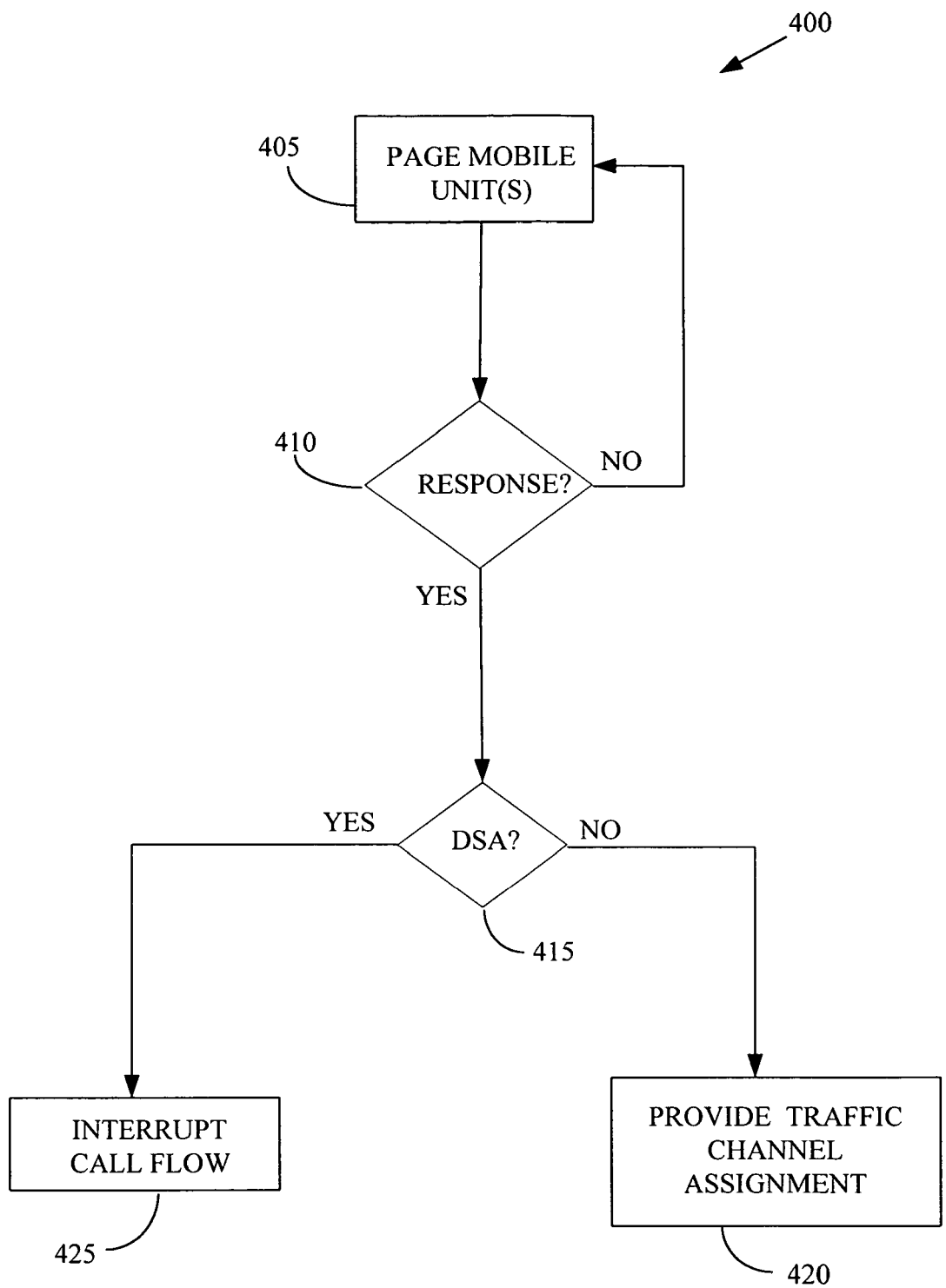
FIG. 4 conceptually illustrates one exemplary embodiment of a method of paging mobile units that may be in a designated security area, in accordance with the present invention.

FIG. 4 conceptually illustrates one exemplary embodiment of a method 400 of paging mobile units that may be in a designated security area. In the illustrated embodiment, one or more mobile units may be paged (at 405) by transmitting or broadcasting a page message. For example, the one or more mobile units may be paged (at 405) by broadcasting the page message to at least one geographic area where the mobile units are expected to be located. Whether or not a page response is received from one or more of the mobile units may then be determined (at 410). For example, a base station may wait a predetermined amount of time for a page response and, if no response is received in the predetermined amount of time, may determine (at 410) that the mobile units are not going to provide a page response. If no response is received, then another page may be broadcast to one or more additional geographic areas. In one embodiment, additional page messages may be broadcast until a maximum number of attempts has been reached.

If it is determined (at 410) that a page response has been received, then whether or not one or more of the responding mobile units is located in a designated security area (DSA) may be determined (at 415). For example, locations of the responding mobile units may be determined and compared to the locations included in a designated security area. If the mobile unit is not in a designated security area, then a traffic channel assignment may be provided (at 420). Additional messages, such as alert messages, may also be provided (at 420). If one or more of the mobile units is in a designated security area, then call flows associated with the mobile units may be interrupted (at 425). For example, traffic channel assignment messages and/or alert messages may be blocked (at 425). Consequently, mobile units in the designated security area may not receive traffic channel assignment messages and/or alert messages and therefore may not take any action to alert a user of the mobile phones, such as ringing, vibration, flashing lights, and the like.

By interrupting call flows for mobile phones located in a designated security area based on reception of a page response message, the likelihood that a mobile phone located in the designated security area may be put to malicious use may be reduced. In particular, the possibility that the alert circuitry in mobile units in the designated security area may be used to trigger an explosive device may be reduced. Furthermore, the network impact of paging escalation caused by blocking page messages to mobile phones in the designated security area may be reduced because the mobile phones in the designated security area remain visible to the wireless communication system 200. Relative to techniques in which page messages to mobile units in the designated security area are blocked, the techniques described above may reduce paging channel loads on base stations neighboring the designated security area, network traffic loads, processor occupancy loads, and the like. Reducing these loads may reduce the likelihood of blocking and/or call dropping.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
providing, from a base station, a first page message to a portion of a cell that overlaps with at least one designated security area;
receiving, at the base station, a page response message from a mobile unit in response to providing the first page message;
determining whether the mobile unit is located in said at least one designated security area using the page response message; and
interrupting, after reception of the page response message, transmissions from the base station to the mobile unit when the mobile unit is located in said at least one designated security area.

2. The method of claim 1, wherein interrupting the transmissions comprises interrupting transmissions on at least one traffic channel.

3. The method of claim 2, wherein interrupting the transmissions to the mobile unit comprises interrupting transmissions to the mobile unit if the mobile unit is located within said at least one designated security area.

4. The method of claim 2, wherein interrupting the transmissions to the mobile unit comprises blocking transmission of at least one alert message from the base station to the mobile unit.

5. The method of claim 3, wherein interrupting the transmissions to the mobile unit comprises preventing assignment of at least one traffic channel between the base station and the mobile unit.

6. The method of claim 5, wherein preventing assignment of at least one traffic channel comprises blocking transmission of at least one traffic channel assignment message from the base station to the mobile unit.

7. The method of claim 1, comprising providing transmissions from the base station to the mobile unit if the mobile unit is not located within said at least one designated security area.

8. The method of claim 1, comprising providing at least one second page message to at least one second geographic area if no page response message is received in response to providing said at least one first page message.

9. A method, comprising:
providing, from a base station, a first page message to a portion of a cell that overlaps with at least one designated security area;
receiving, at the base station, a page response message from a mobile unit in response to providing the first page message;
determining whether the mobile unit is located in said at least one designated security area using the page response message;
interrupting, after reception of the page response message, transmissions from the base station to the mobile unit when the mobile unit is located in said at least one designated security area; and receiving, at the mobile unit after providing said at least one response, transmissions from the base station in response to the base station determining that said at least one response to the first page message did not originate in a designated security area.

10. The method of claim 9, comprising not receiving the transmissions from the base station in response to the base station determining that said at least one response to the first page message originated in the designated security area.

11. The method of claim 10, wherein not receiving the transmissions from the base station comprises not receiving at least one traffic channel assignment message from the base station.

12. The method of claim 10, wherein not receiving the transmissions from the base station comprises not receiving at least one alert message from the base station.

* * * * *

UNITED STATES PATENT AND TRADEMARK OFFICE
CERTIFICATE OF CORRECTION

| | | |
|---|---|---|
| PATENT NO. | : 7,602,793 B2 | Page 1 of 1 |
| APPLICATION NO. | : 11/304066 | |
| DATED | : October 13, 2009 | |
| INVENTOR(S) | : Picot et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 797 days.

Signed and Sealed this

Fifth Day of October, 2010

David J. Kappos
*Director of the United States Patent and Trademark Office*